US007022387B1

(12) United States Patent
Fertig

(10) Patent No.: US 7,022,387 B1
(45) Date of Patent: Apr. 4, 2006

(54) DECORATIVE GLASS BLOCK AND METHOD FOR MAKING A DECORATIVE GLASS BLOCK

(76) Inventor: Dwight Fertig, 5168 John Thomas Rd., Ravenna, OH (US) 44266

( * ) Notice: Subject to any disclaimer, the term of this patent is extended or adjusted under 35 U.S.C. 154(b) by 121 days.

(21) Appl. No.: 10/752,766

(22) Filed: Jan. 8, 2004

(51) Int. Cl.
*B32B 1/02* (2006.01)

(52) U.S. Cl. .................. 428/34.4; 428/131; 428/542.2; 362/806; 52/306

(58) Field of Classification Search ............... 428/34.4, 428/131, 542.2; 52/306, 307; 362/147, 362/806
See application file for complete search history.

(56) References Cited

U.S. PATENT DOCUMENTS 2,395,073 A 2/1946 Schepmoes .................. 160/85
2,565,635 A 8/1951 Thuemau ..................... 40/130
2,740,957 A 4/1956 Davies ....................... 340/380
4,127,892 A 11/1978 Bakalowits et al. .......... 362/32
4,438,484 A 3/1984 Winden ...................... 362/267
4,812,954 A 3/1989 Marton ....................... 362/134
4,887,404 A 12/1989 Saji et al. ..................... 52/306
4,951,181 A 8/1990 Phillips ...................... 362/134
4,969,282 A 11/1990 Eberhart ...................... 40/545
4,992,914 A 2/1991 Heiss et al. .............. 362/153.1
5,006,967 A 4/1991 Diamond .................... 362/147
5,038,542 A * 8/1991 Kline .......................... 52/306
5,448,864 A 9/1995 Rosamond ................... 52/307
5,828,494 A 10/1998 Stremple .................... 359/615
5,951,148 A * 9/1999 Limber ....................... 362/255
6,116,751 A 9/2000 Remp ......................... 362/153
6,457,847 B1 10/2002 LeVasseur .................. 362/351

* cited by examiner

*Primary Examiner*—Alexander S. Thomas
(74) *Attorney, Agent, or Firm*—Renner, Kenner, Greive, Bobak,Taylor & Weber

(57) ABSTRACT

The decorative glass block includes a bowl-shaped first half and a bowl-shaped second half joined together. The first half and the second half each include a face, a lip surrounding the perimeter of the face, and a wall portion extending outwardly from the lip around the perimeter of the face. Decorations including layers of paint, decals, decoupage glaze, and glitter are provided on at least one of the faces. A hole sized to accommodate a string of lights is provided in one of the faces. The decorative glass block is illuminated using a string of lights inserted into the interior of the decorative glass block through the hole. The decorations enhance the appearance of the decorative glass block and the aesthetic value of light transmitted by the decorative glass block when the decorative glass block is illuminated.

9 Claims, 3 Drawing Sheets

DECORATIVE GLASS BLOCK AND METHOD FOR MAKING A DECORATIVE GLASS BLOCK

RELATED PATENT APPLICATIONS

None.

BACKGROUND OF THE INVENTION

This invention relates in general to glass blocks used for decorative purposes, and a method for modifying standard glass blocks to enhance their aesthetic properties.

DESCRIPTION OF THE PRIOR ART

It has long been known to use standard glass blocks as building materials. Such standard glass blocks provide a pleasing aesthetic appearance while at the same time providing structural strength and integrity. To allow for the penetration of light, standard glass blocks are generally formed of a transparent glass material. Furthermore, the surface of the transparent glass material is patterned to diffuse light transmitted from one side of the glass block to the other.

However, since standard glass blocks are made in a batch process, it is has been heretofore difficult to modify individual glass blocks with individualized decorations. For example, to modify individual glass blocks, the batch process would have to be interrupted, and the decorations added to each of the individual glass blocks. Such interruptions would significantly increase the cost of the batch process, and, therefore, increase the cost of individual glass blocks modified with such decorations.

Accordingly, it is desirable to provide a decorative glass block, and a method for making the decorative glass blocks wherein standard glass blocks can be economically modified to enhance their aesthetic appearance after being manufactured in the aforementioned batch process.

SUMMARY OF THE INVENTION

In general, the present invention contemplates a decorative glass block. The decorative glass block includes a bowl-shaped first half and a bowl-shaped second half joined together. The first half and the second half each include a face, a lip surrounding the perimeter of the face, and an interfacing wall portion extending outwardly from the lip around the perimeter of the face. Decorations are provided on at least one of the faces, and a hole is provided in one of the faces, in one of the wall portions, or along the interface between the wall portions. The decorative glass block is illuminated using a string of lights inserted into the interior of the decorative glass block through the hole. The decorations enhance the appearance of the decorative glass block and the aesthetic value of light transmitted by the decorative glass block when the decorative glass block is illuminated.

In accordance with another aspect of the invention, a method for making the decorative glass block entails providing a hollow glass block having two faces and interfacing wall portions extending around the perimeter of the faces. A hole sized to accommodate a string of lights is selectively drilled in one of the faces, in one of the wall portions, and along the interface of the wall portions. Next, the interior of the hollow glass block is filled with a liquid to mix with glass aggregate. Next, the interior of the glass block is drained of the liquid including the glass aggregate, and the interior is subsequently dried. Next, a layer of paint is applied to at least one of the faces, and a layer of decoupage glaze is applied over the layer of paint and the decal. Next, a string of lights is inserted through the hole, and into the interior of the hollow glass block.

A preferred decorative glass block according to the concepts of the present invention is shown by way of example in the accompanying drawings without attempting to show all the various forms and modifications in which the invention might be embodied, the invention being measured by the appended claims and not by the details of the specification.

BEST MODE FOR CARRYING OUT THE INVENTION

Figure 1:
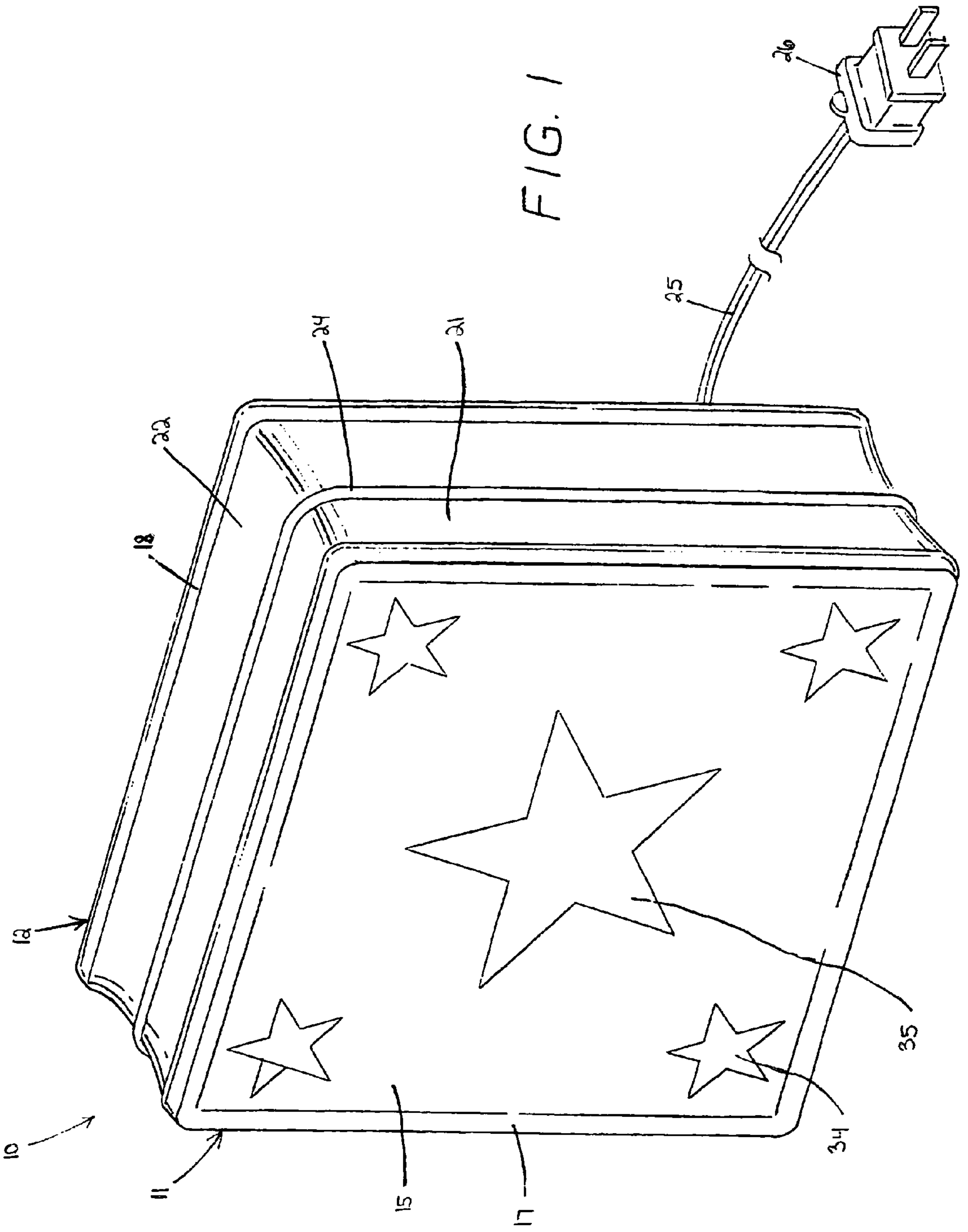
FIG. 1 is a perspective view of the decorative glass block of the present invention.

Referring to FIG. 1, a decorative glass block of the present invention is generally indicated by the numeral 10. The decorative glass block 10 is composed of a first half 11 and a second half 12. The first half 11 and second half 12 are both bowl-shaped, and are mirror images of one another. The decorative glass block 10 is hollow, and the first half 11 and second half 12 enclose an interior area 13.

Figure 2:
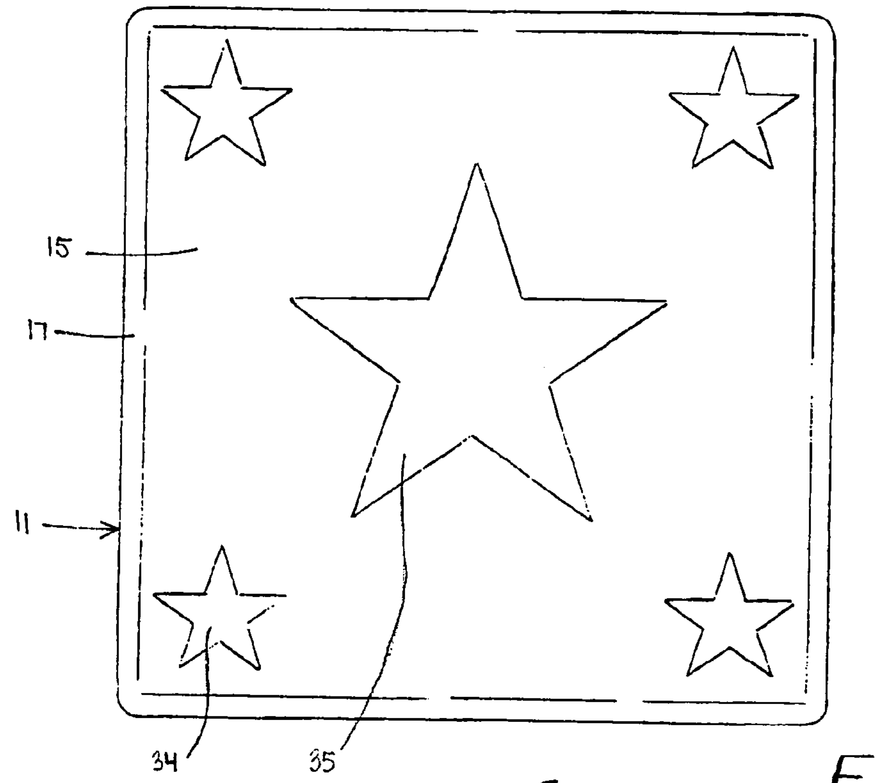
FIG. 2 is a top plan view of the face of the first half of the decorative glass block.
Figure 3:
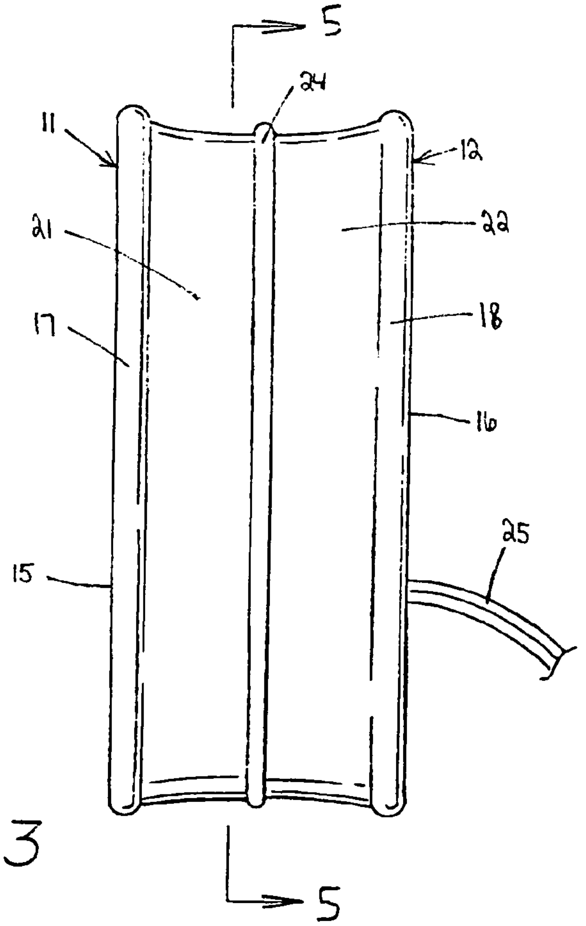
FIG. 3 is a side plan view of the decorative glass block showing the delineation between the first half and the second half.

The first half 11 has a face 15 and the second half 12 has a face 16. A lip 17 surrounds the perimeter of face 15 and a lip 18 surrounds the perimeter of face 16. Extending outwardly from the lip 17 around the perimeter of the face 15 is a wall portion 21. Extending outwardly from the lip 18 around the perimeter of the face 16 is a wall portion 22. The face 15, lip 17, and wall portion 21 form the bowl-shape of the first half 11, and the face 16, lip 18, and wall portion 22 form the bowl-shape of the second half. As seen in FIG. 2, the first half 11 and second half 12 are joined along fused section 24 where the wall portions 21 and 22 respectively of the first half 11 and the second half 12 interface.

Figure 4:
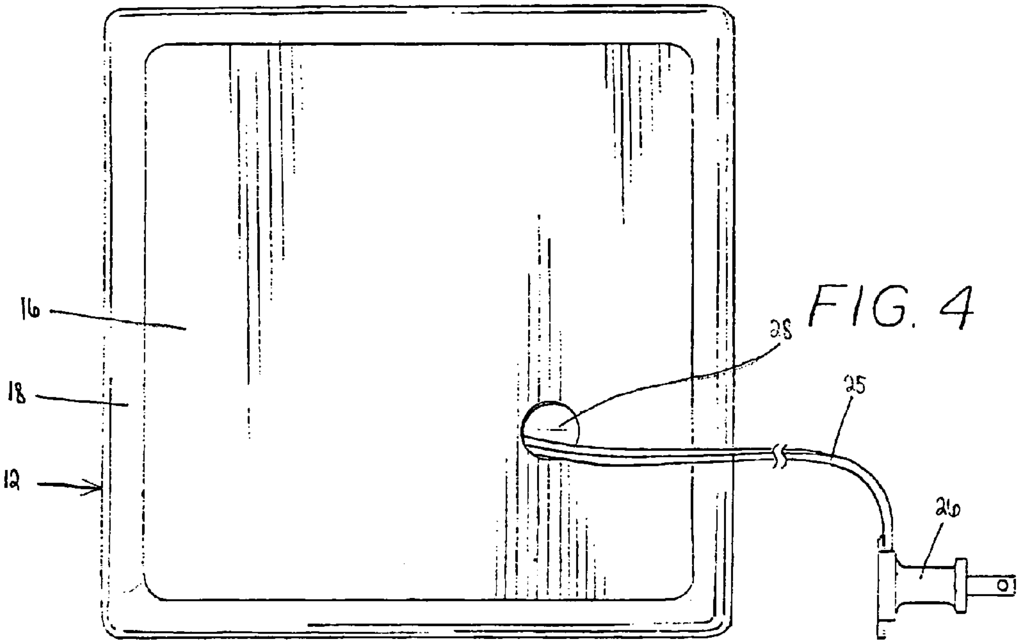
FIG. 4 is a top plan view of the face of the second half of the decorative glass block.
Figure 5:
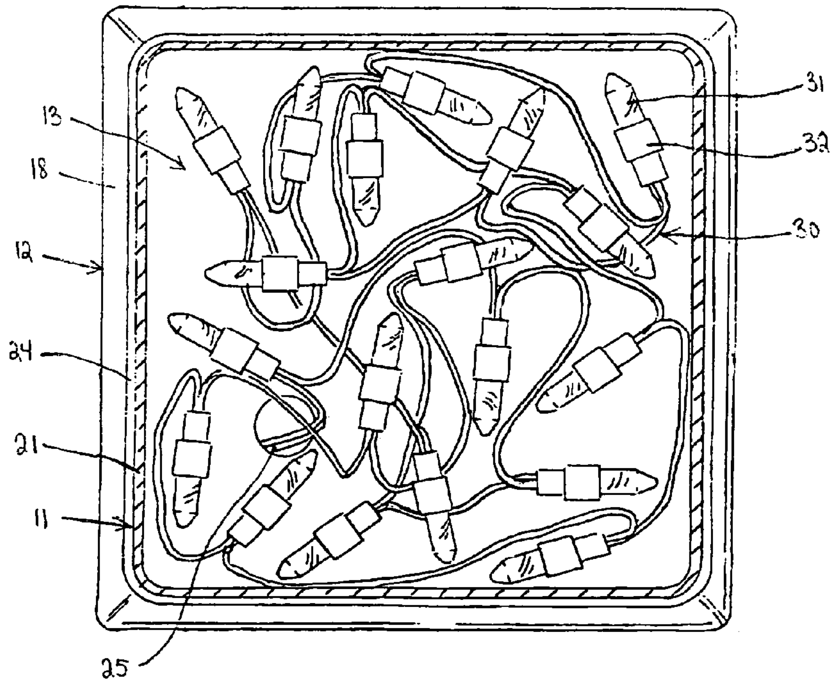
FIG. 5 is cross-section view along Line 5—5 of FIG. 3 showing the interior of the decorative glass block.

As seen in FIG. 4, a hole 28 is provided in the face 16 of the second half 12. Alternately, the hole 28 could be provided in the wall portion 21 or in the wall portion 22, or along the interface between the wall portion 21 and wall portion 22. Furthermore, a string of lights 30, as seen in FIG. 5, is provided in the interior area 13. The string of lights 30 includes an electrical cord 25 and a plug 26. The electrical cord 25 exits the interior area 13 through the hole 28. The electrical cord 25 and the plug 26 are adapted to work with 110 Volt electrical sockets (not shown). The string of lights 30 is provided with a plurality of light bulbs 31 inserted into sockets 32. The plurality of light bulbs 31 are used to illuminate the interior area 13, and transmit light to the exterior of the decorative glass block 10.

To enhance the appearance of the decorative glass block 10, and to increase the aesthetic value of the light transmitted by the decorative glass block 10 when the decorative glass block 10 is illuminated, the first half 11 and the second half 12 can be decorated. Such decorations can include layers of paint, decals, decoupage glaze, and glitter provided on faces 15 and 16. For example, the faces 15 and 16 can be decorated with layers of paint in a variety of colors. The face 15 can be painted with a layer of semi-transparent paint, and the face 16 can be painted with a layer of opaque paint. The layer of semi-transparent paint on the face 15 can effectively "color" the light transmitted by the plurality of light bulbs 31 through the face 15. Moreover, the layer of opaque paint on the face 16 can reflect the transmitted light to the face 15.

Furthermore, either or both of the faces 15 and 16 can be painted with a decorative picture. For example, the decorative picture could be painted on the face 15 using semi-transparent paint. Therefore, the light transmitted by the plurality of light bulbs 31 can pass through the decorative picture, thereby enhancing the aesthetic qualities thereof.

In addition, decals such as small decals 34 and large decals 35 seen in FIGS. 1 and 2, can be provided on the faces 15 or 16 to further enhance the value of the light transmitted by the plurality of light bulbs 31. For example, the small decals 34 and large decals 35 can be adhesive decals or static-cling decals, and can be provided over the layer of paint on the face 15.

Additionally, decoupage glaze can be applied over the small decals 34 and large decals 35, and the layers of paint on the faces 15 and 16 to provide a glossy finish for the decorative glass block 10. Moreover, glitter can be adhered to the decorative glass block 10 to enhance the aforementioned glossy finish by sprinkling the glitter over the decoupage glaze while the decoupage glaze is drying. Such modifications enhance the appearance of the decorative glass block 10, and the aesthetic value of the light transmitted by the decorative glass block 10 when the decorative glass block 10 is illuminated.

The decorative glass block 10 can be manufactured from a standard glass block through the following process. Initially, the hole 28 is drilled in the face 16. As discussed above, the hole 28 is sized to accommodate the string of lights 30. Next, the interior area 13 of the standard glass block is filled with a liquid. The batch process in which the standard glass block was manufactured traps glass aggregate including glass dust and glass chips in the interior area 13 of the standard glass block. Furthermore, drilling the hole 28 creates additional glass dust and glass chips in the interior area 13 of the standard glass block. Therefore, the liquid is mixed with the glass aggregate, and the liquid including the glass aggregate is drained from the interior area 13 of the standard glass block. Next, the interior area 13 of the standard glass block is dried.

Decorations are subsequently applied to the first half 11 and second half 12. For example, layers of paint can be applied to the faces 15 and 16. As discussed above, the face 15 can be painted with a layer of semi-transparent paint, and the face 16 can be painted with a layer of opaque paint. In addition, decals including small decals 34 and large decals 35 can be applied to the standard glass block. As discussed above, such decals can be applied on the face 15 over the layer of paint provided thereon. Additionally, a layer of decoupage glaze can be applied over the standard glass block to cover the layers of paint and decals provided thereon. When applying the decoupage glaze over the decals, the edge of the decals must be sealed to prevent moisture from getting thereunder. Moreover, glitter can be adhered to the standard glass block by sprinkling glitter over the decoupage glaze while the decoupage glaze is drying.

Finally, the string of lights 30 is inserted into the interior area 13 of the standard glass block through the hole 28. The string of lights 30 is not arranged in a particular pattern in the interior area 13. However, the string of lights 30 should ideally provide for substantially uniform transmission of light from the interior area 13 to the exterior of the decorative glass block 10. Furthermore, a portion of the cord 25 should remain on the exterior of the standard glass block to provide the necessary length to allow the plug 26 to be inserted into the wall socket. Through this process, the decorative glass block 10 can be manufactured from a standard glass block.

Thus, it should be evident that the invention disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

What is claimed is:

1. A decorative glass block, comprising:

a bowl-shaped first half and a bowl-shaped second half joined together, wherein said first half and said second half each include a face, a lip surrounding the perimeter of said face, and an interfacing wall portion extending outwardly from said lip around the perimeter of said face;

decorations provided on at least one of said faces;

a layer of semi-transparent paint provided on one of said faces;

a layer of opaque paint provided on the other of said faces;

a layer of decoupage glaze provided over said layers of paint;

a hole selectively provided in one of said faces, in one of said wall portions, or along the interface between said wall portions; and a string of lights inserted into the interior of the decorative glass block through said hole, wherein said decorative glass block is illuminated using said string of lights, and said decorations enhance the appearance of said decorative glass block and the aesthetic value of light transmitted by said decorative glass block when said decorative glass block is illuminated.

2. A decorative glass block according to claim 1, wherein said decorations selectively include layers of paint, pictures, decals, decoupage glaze, and glitter.

3. A decorative glass block according to claim 2, wherein the decals selectively include adhesive decals and static-cling decals.

4. A decorative glass block according to claim 1, further comprising glitter sprinkled over said layer of decoupage glaze.

5. A method of making a decorative glass block, comprising:

providing a hollow glass block having two faces and interfacing wall portions extending around the perimeter of said faces;

selectively drilling a hole in one of said faces, in one of said wall portions, and along the interface of said wall portions, said hole sized to accommodate a string of lights;

filling the interior of said hollow glass block with a liquid to mix with glass aggregate;

draining said interior of said hollow glass block of said liquid including said glass aggregate;

drying said interior of said hollow glass block;

applying a layer of paint to at least one of said faces;

applying a layer of decoupage glaze over said layer of paint; and inserting a string of lights through said hole, and into said interior of said hollow glass block.

6. The method of claim 5, wherein a layer of semi-transparent paint is applied to one of said faces and a layer of opaque paint is applied to the other of said faces.

7. The method of claim 5, further comprising painting a decorative picture on at least one of said two faces.

8. The method of claim 5, further comprising applying at least one decal over said layer of paint, wherein said at least one decal selectively includes adhesive decals and static-cling decals.

9. The method of claim 5, further comprising sprinkling glitter over said layer of decoupage glaze before said layer of decoupage glaze dries.

* * * * *